US012775698B2

(12) United States Patent
Colquhoun et al.

(10) Patent No.: US 12,775,698 B2
(45) Date of Patent: Oct. 27, 2026

(54) CYBERSECURITY EVENT DETECTION SYSTEM AND METHOD

(71) Applicant: Palantir Technologies Inc., Aventura, FL (US)

(72) Inventors: Elliot Colquhoun, Sydney (AU); Andrew Eggleton, Doha (QA); Alexandra Serenhov, Stockholm (SE); Ankit Shankar, San Francisco, CA (US); Brian Keohane, New York, NY (US); Corinne Petroschke, Munich (DE); Darren Zhao, New York, NY (US); Ionut Octavian Iordache, Livingston (GB); Xiao Tang, Singapore (SG); Simon Vahr, London (GB); Tareq Alkhatib, Doha (QA); Athanasios Kontonasios, Middlesex (GB); Thomas Mathew, Brooklyn, NY (US); Rushad Heerjee, London (GB); Fatih Cataltepe, London (GB)

(73) Assignee: Palantir Technologies Inc., Aventura, FL (US)

( * ) Notice: Subject to any disclaimer, the term of this patent is extended or adjusted under 35 U.S.C. 154(b) by 54 days.

(21) Appl. No.: 18/672,230

(22) Filed: May 23, 2024

(65) Prior Publication Data

US 2024/0311471 A1 Sep. 19, 2024

Related U.S. Application Data

(63) Continuation of application No. 17/032,479, filed on Sep. 25, 2020, now abandoned.

(30) Foreign Application Priority Data

Sep. 26, 2019 (GB) ...................................... 1913893

(51) Int. Cl.
*G06F 21/55* (2013.01)
*G06F 21/53* (2013.01)
(Continued)

(52) U.S. Cl.
CPC ............ *G06F 21/552* (2013.01); *G06F 21/53* (2013.01); *G06F 21/566* (2013.01); *G06F 21/57* (2013.01); *G06F 2221/2149* (2013.01)

(58) Field of Classification Search
None
See application file for complete search history.

(56) References Cited

U.S. PATENT DOCUMENTS 9,665,713 B2 * 5/2017 Avasarala ............. G06F 21/566
9,672,355 B2 * 6/2017 Titonis .................. H04W 12/12
(Continued)

FOREIGN PATENT DOCUMENTS

EP 3798880 3/2021

*Primary Examiner* — Farid Homayounmehr
*Assistant Examiner* — Suman Debnath
(74) *Attorney, Agent, or Firm* — Faegre Drinker Biddle & Reath LLP

(57) ABSTRACT

A method, performed by one or more processors, includes: receiving an indication of a desired modification to a cybersecurity event detector that is being contemporaneously used for the detection of potential cybersecurity events in a production environment; modifying, in a sandbox environment, the cybersecurity event detector based on the indication of the desired modification to the cybersecurity event detector; and for each system event in a set of system events, determining, in the sandbox environment, whether the respective system event is indicative of a potential cybersecurity event using the modified cybersecurity event detector. Related apparatus are also disclosed.

20 Claims, 5 Drawing Sheets

(51) Int. Cl.
*G06F 21/56* (2013.01)
*G06F 21/57* (2013.01)

(56) References Cited

U.S. PATENT DOCUMENTS

| | | | | |
|---|---|---|---|---|
| 10,185,826 | B1 | 1/2019 | Thomas et al. | |
| 2007/0217371 | A1 | 9/2007 | Sinha | |
| 2008/0016339 | A1 * | 1/2008 | Shukla | G06F 21/54 713/164 |
| 2011/0145926 | A1 | 6/2011 | Dalcher et al. | |
| 2014/0165129 | A1 | 6/2014 | Fitterer et al. | |
| 2017/0147819 | A1 * | 5/2017 | Vasilenko | G06F 21/577 |
| 2017/0251002 | A1 | 8/2017 | Rostamabadi et al. | |
| 2018/0039776 | A1 | 2/2018 | Loman et al. | |
| 2018/0234434 | A1 | 8/2018 | Viljoen | |
| 2018/0307943 | A1 | 10/2018 | Savkli et al. | |
| 2020/0059481 | A1 * | 2/2020 | Sekar | H04L 63/1425 |
| 2020/0382536 | A1 | 12/2020 | Dherange | |

* cited by examiner

Cybersecurity Event Detector Modification Analysis User Interface 400

CYBERSECURITY EVENT DETECTION SYSTEM AND METHOD

CROSS REFERENCE TO RELATED APPLICATIONS

This application is a continuation of U.S. application Ser. No. 17/032,479, filed Sep. 25, 2020, which claims priority to UK Patent Application No. 1913893.2, currently entitled "Cybersecurity Event Detection System and Method" filed on Sep. 26, 2019, both applications incorporated by reference herein for all purposes.

TECHNICAL FIELD

The present disclosure relates to systems and methods for the detection and analysis of cybersecurity events.

BACKGROUND

Organizations cannot react to cybersecurity events that they cannot detect. Even where organizations have systems in place to detect cybersecurity events, it is important that these systems are improved continuously for various reasons. New types of cybersecurity events may arise, e.g. due to a new vulnerability discovered by a researcher. Specific instances of a known type of cybersecurity event may also not be detected by the system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

A first aspect of the specification provides a method, performed by one or more processors, that includes receiving an indication of a desired modification to a cybersecurity event detector that is being contemporaneously used for the detection of potential cybersecurity events in a production environment; modifying, in a sandbox environment, the cybersecurity event detector based on the indication of the desired modification to the cybersecurity event detector; and for each system event in a set of system events, determining, in the sandbox environment, whether the respective system event is indicative of a potential cybersecurity event using the modified cybersecurity event detector.

In some implementations, the set of system events includes a set of detected production system events, wherein each system event of the set of detected production system events has been determined, using the cybersecurity event detector, to be indicative of a potential cybersecurity event. One or more system events determined to be indicative of a potential cybersecurity event may be excluded, using a cybersecurity event allow listing rule, from the set of detected production system events.

In certain implementations, each system event of a true positive subset of the set of detected production system events may have been labelled as an actual cybersecurity event. In some implementations, the method includes calculating the number of system events of the true positive subset of the set of detected system events determined, using the modified cybersecurity event detector, to be indicative of a potential cyber security event.

Each system event of a false positive subset of the set of detected production system events may have been labelled as not being an actual cybersecurity event. In certain implementation, the method includes calculating the number of system events of the false positive subset of the set of detected system events determined, using the modified cybersecurity event detector, to be indicative of a potential cybersecurity event. The set of system events may include a set of undetected production system events, wherein each system event of the set of undetected production system events has been determined, using the cybersecurity event detector, not to be indicative of a potential cybersecurity event. Each system event of a false negative subset of the set of undetected production system event may have been labelled as being an actual cybersecurity event. The method may include calculating the number of system events of the false negative subset of the set of detected system events determined, using the modified cybersecurity event detector, to be indicative of a potential cybersecurity event.

Determining, in the sandbox environment, that one or more system events of a set of system events are indicative of a potential cybersecurity event may include processing the one or more system events using a search engine library.

In some implementations, the method includes determining, in the production environment, that one or more system events occurring in the production environment are indicative of potential cybersecurity events using the cybersecurity event detector. Determining, in the production environment, that one or more system events occurring in the production environment are indicative of potential cybersecurity events may comprise processing the one or more system events using a cluster-computing framework.

In certain implementations, the method includes sending, to a client device, one or more cybersecurity event detection statistics, wherein each of the cybersecurity event detection statistics is based on the number of system events of a respective subset of the set of system events determined, using the modified cybersecurity event detector, to be indicative of a potential cybersecurity event.

In some implementations, a method, performed by one or more processors, includes: sending, to a server device, an indication of a desired modification to a cybersecurity event detector that is being contemporaneously used for the detection of potential cybersecurity events in a production environment; receiving one or more cybersecurity event detection statistics, wherein each of the one or more cybersecurity event detection statistics is based on the number of system events of a respective subset of a set of system events determined, in a sandbox environment, to be indicative of a potential cybersecurity event using the modified cybersecurity event detector; and displaying the one or more cybersecurity event detection statistics.

In certain implementations, the method includes receiving, from the server device, one or more cybersecurity event detection statistics dependent on the number of system events of the set of system events determined to be indicative of a potential cybersecurity event using the cybersecurity event detector.

In some implementations, the method includes: receiving, from the server device, a representation of the cybersecurity event detector; displaying one or more properties of the cybersecurity event detector; and receiving one or more user inputs indicative of the desired modification to the cybersecurity event detector.

In certain implementations, the method includes: receiving, from the server device, one or more properties of a system event determined to be indicative of a potential cybersecurity event using the modified cybersecurity event detector; and displaying the one or more properties of the system event.

In some implementations, a computer program, optionally stored on a non-transitory computer readable medium, which, when executed by one or more processors of a data processing apparatus cause the data processing apparatus to carry out a method as recited above.

A further aspect of the specification provides apparatus configured to carry out a method as recited above, the apparatus including one or more processors.

BRIEF DESCRIPTION OF THE DRAWINGS

The features of the subject innovations are set forth in the appended claims. However, for purpose of explanation, several aspects of the disclosed subject matter are set forth in the following figures.

DETAILED DESCRIPTION

Reference will now be made in detail to specific example embodiments for carrying out the subject matter of the present disclosure. In the following description, specific details are set forth in order to provide a thorough understanding of the subject matter. It shall be appreciated that embodiments may be practiced without some or all of these specific details.

Cybersecurity Event Detection and Analysis System

Figure 1:
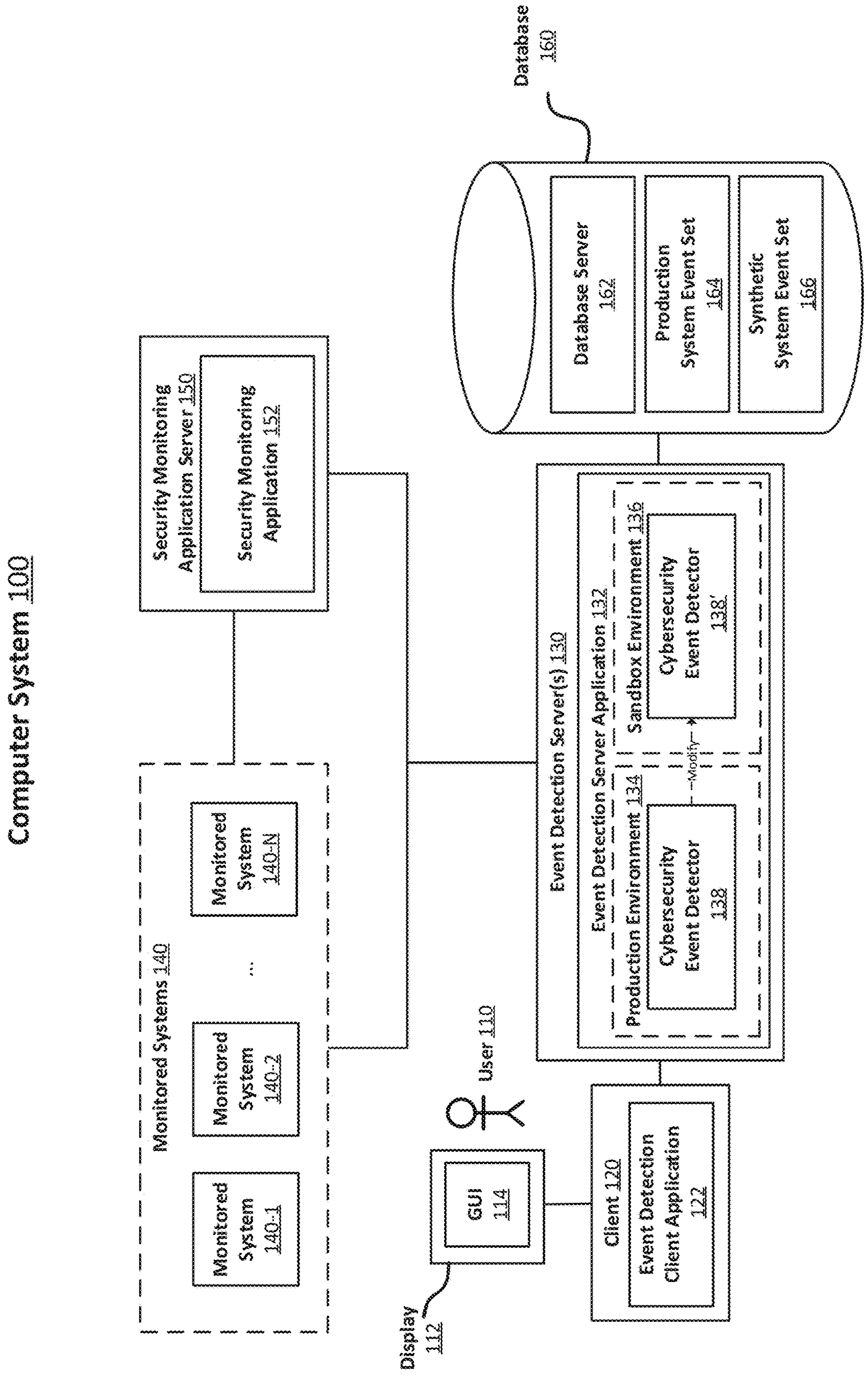
FIG. 1 is a block diagram illustrating an example of a computer system configured to detect and analyze potential cybersecurity events, in accordance with example embodiments.

FIG. 1 illustrates an example of a computer system 100 configured to detect and analyze potential cybersecurity events. As shown, the computer system 100 includes a client computing device 120 used by a human user 110, one or more event detection server(s) 130, one or more monitored systems 140 (including monitored systems 140-1, 140-2, 140-N), a security monitoring application server 150, and a database 160. The client computing device 120 and the event detection system are configured to communicate with one another via a network (not shown). The network may include the Internet, an intranet, a local area network, a wide area network, a wired network, a wireless network, a virtual private network (VPN), and/or any combination of such networks, whether wireless or wired. For ease of understanding, various components of the system have each been described with reference to one or more computing devices. It should be noted that, in some embodiments, any number of these components may be collocated on the same computing device.

The client computing device 120 may for instance be a laptop computer, a desktop computer, a mobile phone, a personal digital assistant (PDA), a tablet computer, a netbook, a television with one or more processors, embedded therein or coupled thereto, a physical machine or a virtual machine. The client computing device 120 may include one or more of a keyboard, a mouse, a display 112, or a touch screen (of which display 112 may be a part of). For example, the client computing device 120 may be composed of hardware components like those of computing device 500 described below with respect to FIG. 5.

The client computing device 120 includes an event detection client application 122 for detecting potential cybersecurity events, modifying cybersecurity event detectors and analyzing the effects of modifications to cybersecurity event detectors. The event detection client application 122 may interact with an event detection server application 132 on the event detection server(s) 130 to provide this functionality. Aspects of the functionality of the event detection client application 122 may be provided using one or more embodiments of the method 300 described with respect to FIG. 3. The functionality of the event detection client application may be accessed by the user 110 using a graphical user interface 114 shown on the display 112. The graphical user interface 114 may be a web browser window, a client application window, an operating system window, an integrated development environment window, a virtual terminal window or other computer graphical user interface window. While only one user 110 and one client computing device 120 are illustrated in FIG. 1, the subject innovations may be implemented in conjunction with one or more users 110 and one or more client computing devices 120.

The event detection server(s) 130 includes one or more processors (e.g. CPUs), a network interface, and memory. The processor(s) is configured to execute computer instructions that are stored in one or more computer-readable media, for example, the memory of the respective server. The event detection server 130 includes a network interface that is configured to allow the server to transmit and receive data in one or more networks, e.g. a network connecting the event detection server 130, the monitored systems 140, the security monitoring application server 150 and the database 160. The network interface may include one or more network interface cards (NICs). The memory of the server stores its respective data and instructions.

The event detection server 130 includes the event detection server application 132. The event detection server application 132 provides functionality for detecting potential cybersecurity events, modifying cybersecurity event detectors, and analyzing the effects of modifications to cybersecurity event detectors. The event detection server application 132 may interact with the event detection client application 122 to provide this functionality. Aspects of the functionality of the event detection server application may be provided using one or more embodiments of the method 200 described with respect to FIG. 2.

The event detection server application 132 includes and/or uses a production environment 134 and a sandbox environment 136. The production environment 134 and the sandbox environment 136 may be insulated from one another using any suitable mechanism. Examples of suitable mechanisms for insulating the environments from one another include using, for each of the environments, distinct variable containers, objects, processes, threads, containers, virtual machines, data partitions, and/or silos. The production environment 134 contains a cybersecurity event detector 138. The sandbox environment 136 contains a cybersecurity event detector 138' which is a modification of the cybersecurity event detector 138.

The production environment 134 is used to actively monitor potential cybersecurity events occurring on the one or more monitored systems 140 such that they can be quickly and effectively rectified. As the production environment 134 is being used for active monitoring, it is particularly desirable that the production environment 134 facilitates consistent and reliable detection of potential cybersecurity events. Accordingly, the cybersecurity event detector 138 may have been rigorously tested and undergone an extensive approval process prior to its use in the production environment 134.

The sandbox environment 136 is used for developing, e.g. modifying and analyzing, cybersecurity event detectors. Cybersecurity event detectors may be developed by assessing their effectiveness using system events stored on the database 160 then accordingly modifying these cybersecurity event detectors to improve their effectiveness. During the development of cybersecurity event detectors, regressions may occur, e.g. a cybersecurity event detector may detect potential cybersecurity events less consistently and reliably than before. Less consistent or reliable detection of cybersecurity events of course can have serious adverse consequences in the system being monitored. Therefore, it is desirable to develop cybersecurity event detectors in the sandbox environment 136 instead of the production environment 134. Accordingly, the modified cybersecurity event detector 138' may undergo an extensive testing process in the sandbox environment 136.

The cybersecurity event detectors 138, 138' may be represented using any suitable format, e.g. as one or more strings, one or more database entries, one or more markup language snippets or files, one or more programming language snippets or files and/or one or more computer executable instructions. An event detector may be persistently stored in one format and loaded into temporary memory and/or executed in another format. For example, the cybersecurity event detector may be persistently stored as a markup language snippet in a markup language file and, before execution, transformed into a code snippet and/or computer executable instructions.

The cybersecurity event detectors 138, 138' determine the occurrence of a potential cybersecurity event based on one or more properties of a system event. The cybersecurity event detector may use one or more rules to determine the occurrence of a potential cybersecurity event. The cybersecurity event detector may use a property comparison rule. For example, the cybersecurity event detector may compare a property value specified by the rule to one or more properties of the system event, e.g. an operating system version. The cybersecurity event detector may use a property combination rule. For example, the cybersecurity event detector may compare several specified property values to properties of the system event and may determine that a potential cybersecurity event has occurred if the properties match all or a sufficient number of the specified property values. The cybersecurity event detector may use a property alternative rule. For example, the cybersecurity event detector may compare a plurality of property values specified by the rule to one or more properties of the system event and determine that a potential cybersecurity event has occurred if the relevant property or properties match at least one of the plurality of specified property values. Matching may refer to an exact match between the property or properties and a specified property value, or matching may include approximate matches, e.g. matches within a given edit distance or a match defined according to a regular expression. These examples should be considered to be non-limiting and a cybersecurity event detector may use any rule which can be performed by one or more processors and uses one or more system events to determine the occurrence of a potential cybersecurity event.

It is described above what filtering rules look like, and how filtering rules can be grouped together. Alternatively or in addition to the rules described above, the cybersecurity event detector may perform any number of operations performable using one or more processors, e.g. logical operations, counting operations and/or arithmetic operations. The cybersecurity event detector may also or additionally use one or more machine learned models to detect potential cybersecurity events, e.g. one or more trained neural networks and/or one or more learned decision trees may be used.

Furthermore, the cybersecurity event detector may operate across multiple events at a time. For instance, in aggregations an alert is produced only if a certain count/average/min/max of some events or field within events, are observed within a certain time period. An example is that of a user getting a password wrong on a system that is not particularly noteworthy, and should not be detected as a cybersecurity event. However, if the number of wrong password entries on a particular system within a short timeframe exceeds some threshold, then it is potentially suspicious behavior. This illustrates that it is not always possible to determine if events are malicious if they are examined only in isolation.

Sequence filters are also provided by the cybersecurity event detector. Here, users are enabled to specify two (or more) filters, which we can call A and B as an example. A and B are not malicious if they occur independently, but if both occur within a certain timeframe, then an alert is triggered.

As stated above, values specified in the rule are compared against the system events. Also compared against the system events are values from datasets that are continuously refreshed and updated, potentially with outside knowledge from other workflows or third parties. An example here is a detector that flags occurrences of network traffic where the source/destination IP address matches a blacklisted IP address. The blacklist here is not necessarily encoded in the rule, but the rule keeps a reference to it.

The system events processed using the cybersecurity event detectors 138, 138' may include any number of the following properties: an identifier; a time at which the system event occurred; details of a system on which the system event occurred, e.g. hostname, a network address, operating system details, etc.; details of one or more security vulnerabilities associated with the system on which the system event occurred; details of a network and/or network zone within which the system event occurred; details of a remote service call associated with the system event; a number of times a similar or identical system event has occurred; and/or details of an application causing the system event.

The system events processed using the cybersecurity event detectors 138, 138' are derived using system event records. Examples of system event records include system log records, e.g. produced by one or more of the monitored systems 140, and security event records produced by a security monitoring application, e.g. security monitoring application 152. System log records may be Windows® event log records or Linux log records.

Windows® event log records may be stored in one or more of a Windows® Application log, a Windows® Security log, a Windows® Setup log, a Windows® System log, a Windows® Forwarded Events log, and application and/or service specific logs. Windows® event log records may be stored and/or output in the Windows XML event log (EVTX) format, which is a binary XML format, or in a format representing the data contained therein, e.g. the data in a human-readable XML format. Windows® event log records include one or more of the following properties: keywords, user, operational code, log (e.g. log text and/or markup), computer, process ID, thread ID, processor ID, session ID, kernel time, user time, processor time, correlation ID, relative correlation ID, and event source name.

Linux log records may be in a standardized format specified by the Internet Engineering Task Force (IETF) RFC 5424 standard or the IETF RFC 3164 format. Linux log file records may be stored in one or more log files. The one or more log files may be stored in a log directory of a Linux system, e.g. a '/var/log' directory. Examples of log files include: messages, syslog, auth.log, kern.log and cron. Linux log file records include one or more of the following properties: a timestamp, a hostname, an IP address, a facility code, a severity level, a message component, a tag, a version number, an application name, a process identifier, and a message identifier.

Other examples include log records that are above the Operating System level. Such log records can be used to produce detection events from network devices such as firewalls and DNS hosts.

Further examples include Syslog-formatted data (e.g. CEF format or JSON), which can be used to produce log events.

Each of the one or more monitored systems 140 may include one or more processors (e.g. CPUs), a network interface, and memory. The processor(s) is configured to execute computer instructions that are stored in one or more computer-readable media, for example, the memory of the respective monitored system. Each of the one or more monitored systems includes a network interface that is configured to allow the monitored system to transmit and receive data in one or more networks, e.g. a network connecting the monitored system with the event detection server 130 and/or with other monitored systems. The network interface may include one or more network interface cards (NICs). The memory of each monitored system stores its respective data and instructions.

The one or more monitored systems 140 may be a plurality of monitored systems 140 in a network of a sizable organization, e.g. an organization having more than 50 systems. Examples of such organizations include enterprises; governments, and departments or organizations thereof; and non-governmental organizations. The one or more monitored systems 140 may be monitored systems probable to be threatened by malicious actors. These malicious actors may be internal or external malicious actors with permission to access one or more of the monitored systems 140. The malicious actors may alternatively or additionally be internal or external malicious actors without access to one or more of the monitored systems 140.

A security monitoring application server 150 may include the security monitoring application 152. The security monitoring application 152 may monitor the one or more monitored systems 140, or a subset thereof. The security monitoring application 152 may monitor activities occurring on the monitored systems; provide properties of the monitored systems; and provide information about data on said systems. The security monitoring application 152 may output, or otherwise generate, system event records used for deriving system events to be processed by the cybersecurity event detectors 138, 138'. Examples of security monitoring applications include System Center Operations Manager (SCOM); Nagios; Rudder; and appropriately configured instances of Splunk and/or Kibana. The security monitoring application 152 may be a network monitoring application. Examples of network monitoring applications include Zeek, Siricata and Snort. The security monitoring application 152 may be an endpoint monitoring application. Examples of endpoint monitoring applications include Endgame, Carbonblack and CrowdStrike. The security monitoring application 152 may be an advanced threat protection (ATP) application, e.g. Microsoft Office 365 Advanced Threat Protection. The security monitoring application 152 may be an antivirus application, e.g. AVG Antivirus, BitDefender Security, ClamAV, Microsoft Windows Defender and Sophos Anti-Virus.

The database 160 includes a database server module 162 for storing and retrieving data including a detected system event set 164 and a synthetic system event set 166. The database 160 may be implemented as a single server computing device or as multiple server computing devices arranged in a distributed or clustered computing arrangement. Each such server computing device may be composed of hardware components like those of computing device 500 described below with respect to FIG. 5.

The database 160 may include one or more processors (e.g., CPUs), a network interface, and memory. The processor(s) may be configured to execute computer instructions that are stored in one or more computer-readable media, for example, the memory of the database 160. The database 160 may include a network interface that is configured to allow the database 160 to transmit and receive data in one or more networks. The network interface may include one or more network interface cards (NICs). The memory of the database 160 may store data or instructions. The instructions stored in the memory may include the database server module 162.

The production system event set 164 and/or the synthetic system event set 166 are used for assessing the effectiveness of cybersecurity event detectors. For example, the effectiveness of the modified cybersecurity event detector 138' may be assessed during its development in the sandbox environment 136.

The production system event set 164 includes system events from production systems, e.g. monitored systems 140. The production system event set 164 may include a set of detected production system events and a set of undetected production system events.

The set of detected production system events may include system events detected in one or more production systems, e.g. monitored systems 140, using the cybersecurity event detector 138. One or more system events detected in the one or more production systems using the cybersecurity event detector may be excluded from the set of detected production system events using an allowlisting rule (i.e. a whitelisting rule). The allowlisting rule (i.e. whitelisting rule) may exclude system events having certain properties or property combinations, e.g. system events where the host has a specified IP address may be excluded. The set of detected production system events may have a true positive subset and a false positive subset. The true positive subset includes system events determined to be indicative of a potential cybersecurity event using the cybersecurity event detector 138 and labelled, e.g. by a user, as actual cybersecurity events. The false positive subset includes system events determined to be indicative of a potential cybersecurity event using the cybersecurity event detector 138 but labelled, e.g. by a user, as not being actual cybersecurity events.

The set of undetected production system events includes system events from one or more production systems, e.g. monitored systems 140, which were not detected using the cybersecurity event detector 138. The set of undetected production system events may have a false negative subset. The false negative subset includes system events labelled, e.g. by a user, as being actual cybersecurity events but determined not to be indicative of a potential cybersecurity event using the cybersecurity event detector 138.

The synthetic system event set 166 includes system events that are not from production systems and have been created by a user and/or a computer program. The system events in the synthetic system event set 166 may be used to assess the effectiveness of cybersecurity event detectors for system events which have not yet occurred or at least have not been detected in actual systems facilitating the pre-emptive development of cybersecurity event detectors.

Cybersecurity Event Detector Modification Method

Figure 2:
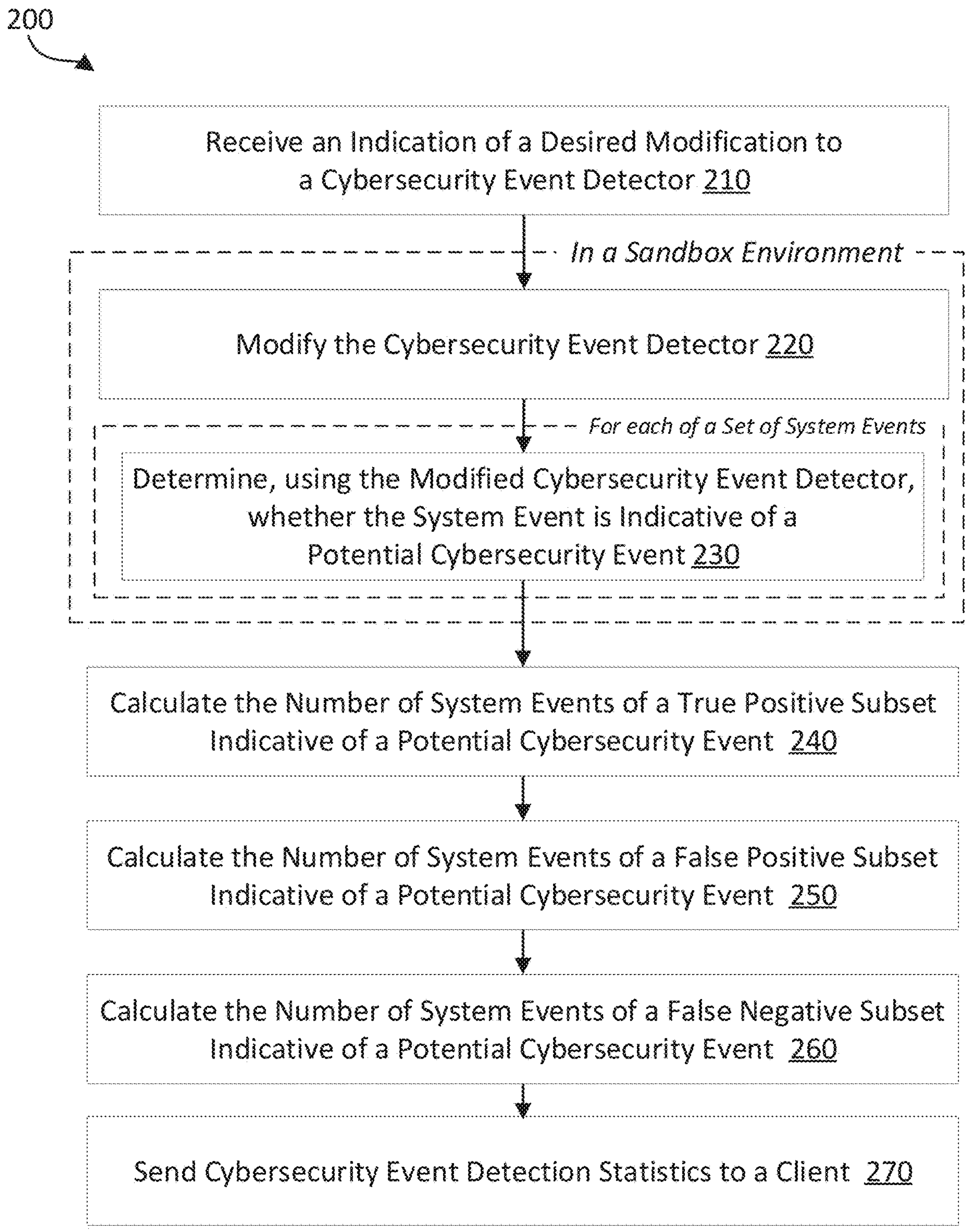
FIG. 2 is a flow diagram illustrating an example method for modifying cybersecurity event detectors, in accordance with example embodiments.

FIG. 2 is a flowchart illustrating an example method 200 for modifying cybersecurity event detectors. The method 200 is performed by computer-readable instructions, e.g. software, for execution by one or more processors of one or more computing devices (e.g., the computing device 500 of FIG. 5). In one embodiment, the one or more computing devices are one or more event detection servers 130. The method 200 may be performed using an event detection software application, e.g. event detection server application 132. The event detection software application may be any number of and/or any combination of sequences of instructions, interpretable code, loadable modules, dynamic link libraries and/or computer programs. The event detection software application may be implemented on a single computing device or distributed across multiple computing devices.

At least steps 220 and 230 of the method 200 are performed in a sandbox environment. The other steps of the method may be performed in the sandbox environment but may be performed outside the sandbox environment. The sandbox environment is an environment isolated from another environment, e.g. a production environment, using any suitable mechanism. Examples of suitable mechanisms for insulating the sandbox environment include variable containers, objects, processes, threads, containers, virtual machines, data partitions, and/or silos.

At step 210, an indication of a desired modification to a cybersecurity event detector is received. The cybersecurity event detector is contemporaneously used for the detection of potential cybersecurity events in a production environment.

The desired modification may be any suitable modification to the cybersecurity event detector. The cybersecurity event detector may use one or more rules to determine the occurrence of the potential cybersecurity event and the desired modification may be a change to one or more of these rules. For example, the cybersecurity event detector may use a property comparison rule to compare a property specified by the rule to one or more properties of the system event, e.g. an operating system version, and the desired modification is a change to the property specified by the rule, e.g. a change to the operating system version specified by the rule.

The contemporaneous use of the cybersecurity event detector in the production environment may include using the cybersecurity event detector to determine that one or more system events occurring in the production environment are indicative of potential cybersecurity events. Determining that the one or more system events occurring in the production environment are indicative of potential cybersecurity events may include processing the potential cybersecurity events using a cluster-computing framework, such as Apache Spark. The cluster-computing framework may be adapted for the batch processing of large quantities of data.

The indication of the desired modification may be received in any suitable form, e.g. as mark-up language data, programming language code, plain text, or a series of instructions. The indication of the desired modification may be received using any suitable mechanism, e.g. via a remote service call, a representational state transfer (REST) operation; an API call; an internal networking protocol; a file sharing protocol or service; or shared memory or persistent storage.

At step 220, the cybersecurity event detector is modified based on the desired modification. The step 220 occurs in the sandbox environment so the contemporaneous use of the cybersecurity event detector in the production environment is unaffected by the modification.

The step 230 is performed for each of a set of system events. For each system event in the set of system events, step 230 determines whether the respective system event is indicative of a potential cybersecurity event using the modified cybersecurity detector.

The set of system events may be retrieved and/or received for the determining using any suitable mechanism. Examples of suitable mechanisms for retrieving the set of system events include retrieving the set of system events from: a database, such as Apache Cassandra or Riak; a file storage system; or object storage, e.g. Hadoop FS (HDFS) or Amazon® Simple Storage Service (S3). Examples of suitable mechanisms for receiving the set of system events include receiving the set of systems events using one or more remote service calls; one or more representational state transfer (REST) operations; or one or more API calls.

The determining may include processing the set of system events using a search engine library, e.g. ElasticSearch or Apache Solr. The search engine library may be optimized for online use, e.g. facilitating fast determinations for at least some of the set of system events such that at least some results are shown to the user in a shorter time than for systems adapted for batch processing.

The result of the determination may be stored temporarily or persistently for further processing, e.g. for the remaining steps of the method 200, using any suitable mechanism. Suitable mechanisms for temporary storage include storing the results in: an in-memory data structure, such as a list, a results object; a temporary file and/or an in-memory database or cache, e.g. Apache Ignite or Redis. Suitable mechanisms for persistent storage include storing the results in: a database, such as Apache Cassandra or Riak; one or more file on a file storage system; or object storage, e.g. Hadoop FS (HDFS) or Amazon® Simple Storage Service (S3).

The set of system events may be a set of system events for assessing the effectiveness of the modified cybersecurity event detector. The set of system events may include a set of synthetic system events and/or a set of production system events.

The set of production system events includes system events from production systems, e.g. systems being used in an organization for purposes other than development and testing. The set of production system events may include a set of detected production system events and a set of undetected production system events.

The set of detected production system events may include system events detected in one or more production systems, e.g. systems being used for purposes other than development and testing, using the cybersecurity event detector prior to the modification. One or more system events detected in the one or more production systems using the cybersecurity event detector prior to the modification may be excluded from the set of detected production system events using an allowlisting rule (i.e. whitelisting rule). The allowlisting rule (i.e. whitelisting rule) may exclude system events having certain properties or property combinations, e.g. system events where the host has a specified IP address may be excluded. The set of detected production system events may have a true positive subset and a false positive subset. The true positive subset includes system events determined to be indicative of a potential cybersecurity event using the cybersecurity event detector, prior to the modification, and labelled, e.g. by a user, as actual cybersecurity events. The false positive subset includes system events determined to be indicative of a potential cybersecurity event using the cybersecurity event detector, prior to the modification, but labelled, e.g. by a user, as not being actual cybersecurity events.

The set of undetected production system events includes system events from one or more production systems, systems being used for purposes other than development and testing, which were not detected using the cybersecurity event detector prior to the modification. The set of undetected production system events may have a false negative subset. The false negative subset includes system events labelled, e.g. by a user, as being actual cybersecurity events but determined not to be indicative of a potential cybersecurity event using the cybersecurity event detector prior to the modification.

The set of synthetic system events includes system events which are not from production systems and have been created by a user and/or a computer program. The system events in the set of synthetic may be used to assess the effectiveness of the modified for system events which have not yet occurred, or at least have not been detected in actual systems, facilitating the pre-emptive development of cybersecurity event detectors.

At step 240, the number of system events of the true positive subset determined, using the modified cybersecurity event detector, to be indicative of a potential cybersecurity event is calculated. The system events of the true positive subset are system events which were determined, using the cybersecurity event detector prior to modification, to be indicative of a potential cybersecurity event and were labelled as being actual cybersecurity events. The system events in the true positive subset were correctly detected as cybersecurity events by the cybersecurity event detector prior to the modification. If one or more of the system events in the true positive are determined, using the modified cybersecurity event detector, not to be indicative of a potential cybersecurity event, the modification to the cybersecurity event detector has caused a regression.

At step 250, the number of system events of the false positive subset determined, using the modified cybersecurity event detector, to be indicative of a potential cybersecurity event is calculated. The system events of the false positive subset are system events which were determined, using the cybersecurity event detector prior to modification, to be indicative of a potential cybersecurity event but were labelled as not being actual cybersecurity events. The system events in false positive subset were incorrectly detected as cybersecurity events by the cybersecurity event detector prior to the modification. If one or of the system events are determine, using the modified cybersecurity event detector, not to be indicative of a potential cybersecurity event, the modification has improved the cybersecurity event detector. The fewer system events are incorrectly detected as being indicative of potential cybersecurity events then the less time users, e.g. cybersecurity analysts, spend analyzing incorrectly detected system events. The system events determined to be indicative of potential cybersecurity events may alternatively or additionally be processed using one or more other computer programs, e.g. statistical analysis or pattern matching software, so reducing the number of system events incorrectly detected as being indicative of potential cybersecurity events may reduce the computational resources used.

At step 260, the number of system events of the false negative subset determined, using the modified cybersecurity event detector, to be indicative of a potential cybersecurity event is calculated. The system events of the false positive subset are system events which were determined, using the cybersecurity event detector prior to modification, not to be indicative of a potential cybersecurity event but were labelled as being actual cybersecurity events. Despite being actual cybersecurity events, the system events in the false negative subset were not detected as cybersecurity events by the cybersecurity event detector prior to the modification. If one or more of the system events are determined, using the modified cybersecurity event detector, to be indicative of a potential cybersecurity event, the modification to the cybersecurity event detector has improved the event detection capabilities of the cybersecurity event detector.

At step 270, one or more cybersecurity event detection statistics are sent to a client device. Each of the cybersecurity event detection statistics is based on the number of system event events of a respective subset of the set of system events determined to be indicative of a potential cybersecurity event. The respective subsets may include the true positive subset, the false positive subset and the false negative subset. The one or more cybersecurity event detection statistics may include the number of system events of one or more of these subsets determined to be indicative of potential cybersecurity events using the modified cybersecurity event detectors as calculated in steps 240-260. Each of the cybersecurity event detection statistics may additionally be based on the size of the respective subset of the set of system events. The one or more cybersecurity event detection statistics may include the proportion of system events of the respective subset of the set of system events determined to be indicative of a potential cybersecurity event. The proportion may be a percentage, a fraction or a decimal.

The one or more cybersecurity event detection statistics may be sent using any suitable mechanism, e.g. via a remote service call, a representational state transfer (REST) operation, an internal networking protocol; and/or shared memory or persistent storage. The one or more cybersecurity event detection statistics may be sent in any suitable form. For example, the one or more cybersecurity event detection statistics may be sent as one or more integers, one or more floating point numbers, one or more strings; and/or may be included in XML formatted data, one or more JSON objects, one or more files and/or in a platform specific markup or binary format.

Based on the results of one or more of the steps 230-270, the cybersecurity event detector may also be modified in the production environment and the modified cybersecurity event detector subsequently used for the detection of cybersecurity events in the production environment. In response to the results of one or more of steps 240-260 indicating that the number of true positives detected has not decreased; the number of false positives has not increased and/or the number of false negatives has not increased, the modification to the cybersecurity event detector may be made in the production environment, e.g. without user intervention. Alternatively, the modification may be made in the production environment in response to one or more messages received from the client device. The one or more messages received from the client device may be based on one or more inputs by a user indicating that the modification is to be applied in the production environment. The decision by the user to apply the modification in the production environment may be based on the received one or more cybersecurity event detection statistics.

Cybersecurity Event Detector Modification Analysis Method

Figure 3:
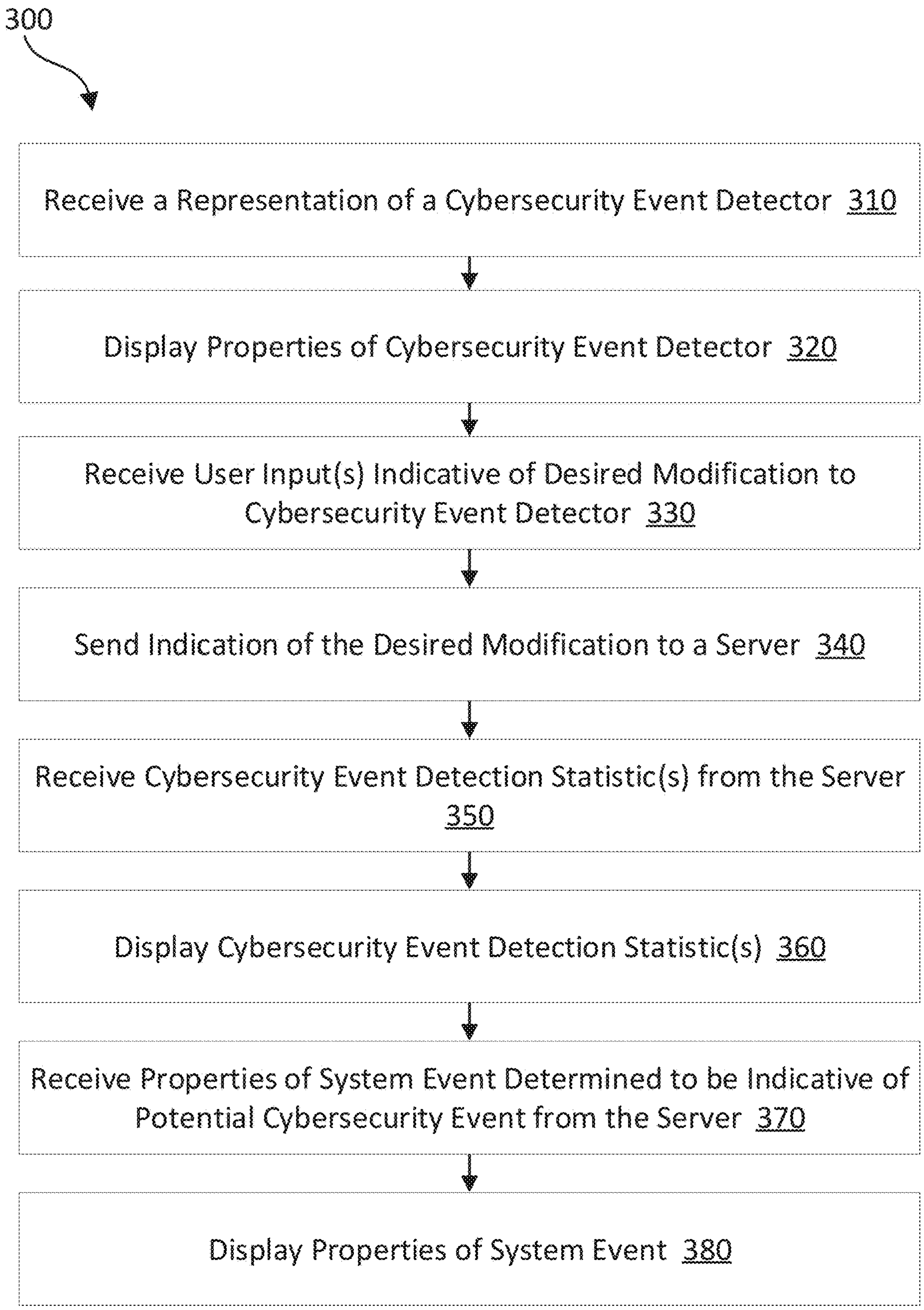
FIG. 3 is a flow diagram illustrating an example method for analyzing the effects of modifications to cybersecurity event detectors, in accordance with example embodiments.

FIG. 3 is a flowchart illustrating an example method 300 for analyzing the effects of modifications to cybersecurity event detectors. The method 300 is performed by computer-readable instructions, e.g. software, for execution by one or more processors of one or more computing devices (e.g., the computing device 500 of FIG. 5). In one embodiment, the one or more computing devices are the client computing device 120. The method 300 may be performed using an event detection client application e.g. event detection client application 122. The event detection client application may be any number of and/or any combination of sequences of instructions, interpretable code, loadable modules, dynamic link libraries and/or computer programs.

At step 310, a representation of the cybersecurity event detector is received from a server device. The representation of the cybersecurity event detector may be in any suitable format, e.g. one or more strings; one or more markup language snippets or files and/or one or more programming language snippets or files. The representation of the cybersecurity event detector may include an indication of one or more rules used by the cybersecurity event detector. Where the one or more rules use one or more system event properties, the representation of the cybersecurity event detector may include the system event property names and/or the system event property values. Where the cybersecurity event detector may also or additionally use one or more machine learned models to detect potential cybersecurity events, the representation of the cybersecurity event detector may include details of these one or more machine learned models.

At step 320, one or more properties of the cybersecurity event detector are displayed. The one or more properties may be displayed on a part of a display as part of a GUI which may take any of the forms described. The one or more properties may be displayed on the display simultaneously or using user interface elements whereby a user provides inputs to access some of the one or more properties. For example, the user may scroll down or scroll across to access some of the one or more properties and/or may click a user interface element, e.g. an expand button, to access some of the one or more of the one or more properties. The one or more properties may be displayed in a format corresponding to and/or based on the representation of the cybersecurity event detector. For example, where the representation of the cybersecurity event detector is one or more markup language snippets or files, the display format may be based on the structure of the markup language.

At step 330, one or more user inputs indicative of a desired modification to the cybersecurity event detector are received. The one or more user inputs may be received in any suitable form, e.g. mouse clicks, touchscreen taps, and/or (physical or virtual) keyboard text entry. The one or more user inputs may be directed at relevant user interface elements, e.g. user elements displaying the one or more properties of the cybersecurity event detector which are to be modified.

The desired modification may be any suitable modification to the cybersecurity event detector. The cybersecurity event detector may use one or more rules to determine the occurrence of the potential cybersecurity event and the desired modification may be a change to one or more of these rules. For example, the cybersecurity event detector may use a property comparison rule to compare a property specified by the rule to one or more properties of the system event, e.g. an operating system version, and the desired modification is a change to the property specified by the rule, e.g. a change to the operating system version specified by the rule.

At step 340, an indication of the desired modification to the cybersecurity event detector is sent to a server device. The cybersecurity event detector to be modified is contemporaneously used, e.g. by the server device or another server device in the system, for the detection of potential cybersecurity events in a production environment.

The indication of the desired modification may be sent in any suitable form, e.g. as mark-up language data, programming language code, plain text, or a series of instructions. The indication of the desired modification may be sent using any suitable mechanism, e.g. via a remote service call, a representational state transfer (REST) operation; an API call; an internal networking protocol; a file sharing protocol or service; or shared memory or persistent storage.

At step 350, one or more cybersecurity event detection statistics are received, e.g. from the server device or another server device. Each of the one or more cybersecurity event detection statistics is based on the number of system events of a respective subset of a set of system events determined, in a sandbox environment, to be indicative of a potential cybersecurity event using the modified cybersecurity event detector. The respective subsets may include one or more of a true positive subset, a false positive subset and a false negative subset. Each of the cybersecurity event detection statistics may additionally be based on the size of the respective subset of the set of system events. The one or more cybersecurity event detection statistics may include the proportion of system events of the respective subset of the set of system events determined to be indicative of a potential cybersecurity event. The proportion may be a percentage, a fraction or a decimal.

The one or more cybersecurity event detection statistics may be received using any suitable mechanism, e.g. via a remote service call, a representational state transfer (REST) operation, an internal networking protocol; and/or shared memory or persistent storage. The one or more cybersecurity event detection statistics may be received in any suitable form. For example, the one or more cybersecurity event detection statistics may be received as one or more integers, one or more floating point numbers, one or more strings; and/or may be included in XML formatted data, one or more JSON objects, one or more files and/or in a platform specific markup or binary format.

At step 360, the one or more cybersecurity event detection statistics are displayed. The one or more cybersecurity event detection statistics may be displayed on a display as part of a GUI which may take any of the forms described. The one or more cybersecurity event detection statistics may be displayed on the display simultaneously or using user interface elements whereby a user provides inputs to access some of the one or more cybersecurity event detection statistics. For example, the user may scroll down or scroll across to access some of the one or more cybersecurity event detection statistics and/or may click a user interface element, e.g. an expand button, to access some of the one or more cybersecurity event detection statistics. Displaying the one or more cybersecurity event detection statistics may include transforming the statistics into a more accessible form, e.g. a decimal proportion may be transformed to a percentage. An example GUI 400 where one or more cybersecurity event detection statistics may be displayed is described with respect to FIG. 4.

At step 370, one or more properties of a system event are received. The system event is a system event determined, using the modified cybersecurity event detector, to be indicative of a potential cybersecurity event detector. The one or more properties of the system event may include any number of: an identifier; a time at which the system event occurred; details of a system on which the system event occurred, e.g. hostname, a network address, operating system details, etc.; details of one or more security vulnerabilities associated with the system on which the system event occurred; details of a network and/or network zone within which the system event occurred; details of a remote service call associated with the system event; a number of times a similar or identical system event has occurred; and/or details of an application causing the system event.

The one or more properties of the system event may be received using any suitable mechanism, e.g. via a remote service call, a representational state transfer (REST) operation, an internal networking protocol; and/or shared memory or persistent storage. The one or more properties of the system event may be received in any suitable form. For example, the one or more properties of the system event may be received as one or more strings; and/or may be included in XML formatted data, one or more JSON objects, one or more files and/or in a platform specific markup or binary format.

At step 380, the one or more properties of the system event are displayed. Displaying one or more properties of the system event, which has been determined to be indicative of a potential cybersecurity event, improve users' understanding of the functioning of the modified cybersecurity event detector. This improvement in users' understanding may aid users in making beneficial modifications to the cybersecurity event detector. For example, it may aid users in making modifications which cause fewer cybersecurity event detector regressions; improve the cybersecurity event detectors detection of actual cybersecurity events; and reduce the number of system events incorrectly determined to be potential cybersecurity events by the cybersecurity event detector.

The one or more properties of the system event may be displayed on a display as part of a GUI which may take any of the forms described. The GUI may be the GUI used to display the one or more cybersecurity event detection statistics at step 360 or may be a different GUI. The one or more properties of the system event may be displayed on the display simultaneously or using user interface elements whereby a user provides inputs to access some of the one or more properties of the system event. For example, the user may scroll down or scroll across to access some of the one or more properties of the system event s and/or may click a user interface element, e.g. an expand button, to access some of the one or more properties of the system event. The one or more properties of the system event may be displayed in a format corresponding to and/or based on the format in which the one or more properties of the system event are received. For example, where the one or more properties of the system event are received as one or more markup language snippets or files, the display format may be based on the structure of the markup language.

One or more user inputs may also be received indicating that the desired modification to the cybersecurity event detector should be applied in the production environment. Based on these one or more user inputs, one or more messages indicating that the desired modification should be applied in the production environment may be sent to the server device. The decision by the user to apply the modification in the production environment may be based on the displayed one or more cybersecurity event detection statistics. For example, the user may decide to apply the modification in the production environment if the proportion of true positives has not decreased, the proportion of false positives has not increased and/or the proportion of false negatives has not increased.

Graphical User Interface

Figure 4:
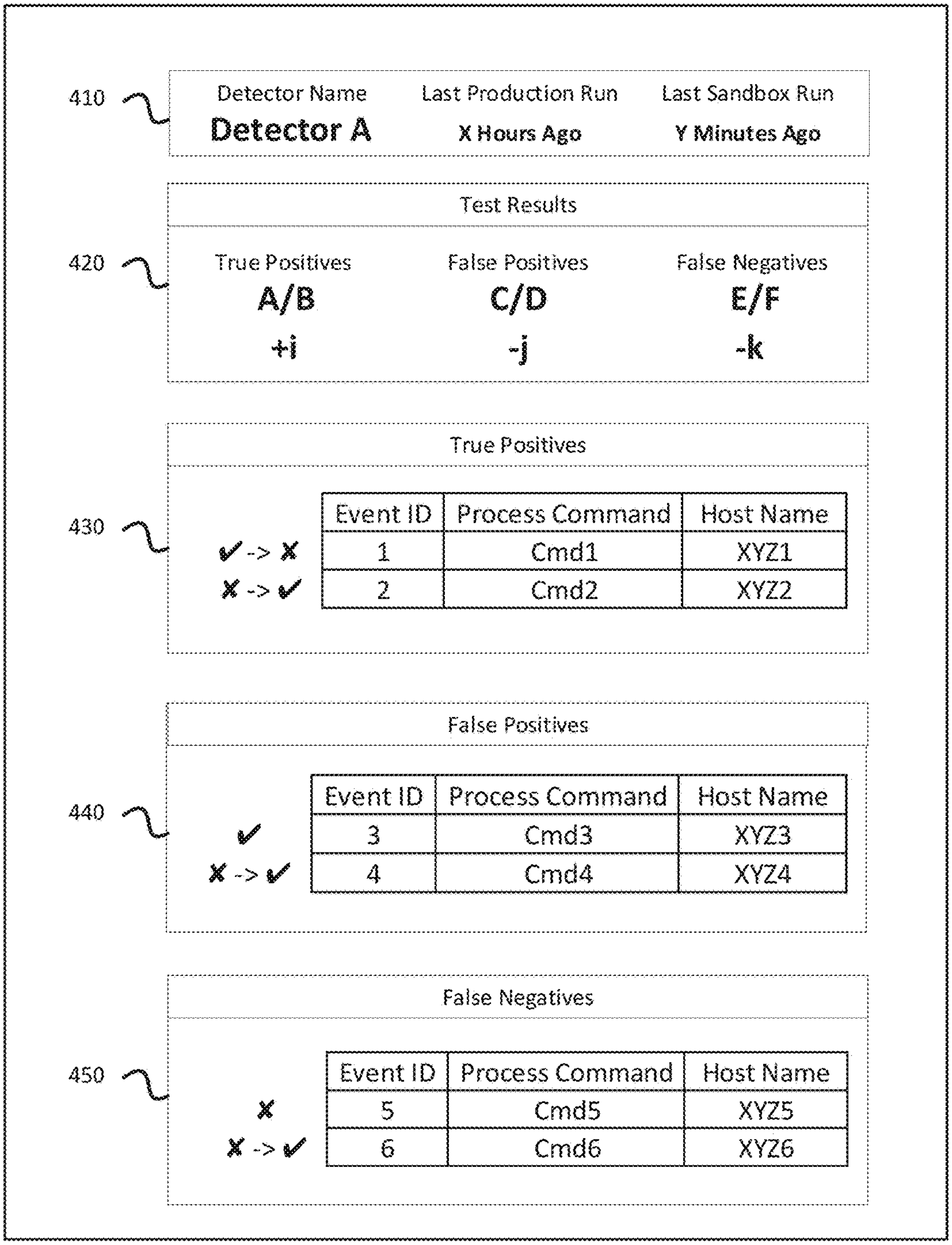
FIG. 4 is a representative drawing, illustrating an example instance of a graphical user interface for analyzing the effects of modifying cybersecurity event detectors.

FIG. 4 illustrates an example graphical user interface (GUI) 400 for analyzing the effects of modifying cybersecurity event detectors. The GUI 400 may be displayed by an event detection client application, e.g. the event detection client application 122. For ease of explanation, the elements are shown in a single window but it should be noted that one or more parts of the illustrated GUI 400 may be in a separate tab, window or overlay, and/or may be dynamically shown or hidden.

The GUI 400 includes a header element 410. The illustrated header element 410 includes the name of the cybersecurity event detector; how long ago the cybersecurity event detector was last run in production; and the last time the (modified) cybersecurity event detector was run in the sandbox.

The GUI 400 includes a test results pane 420. The test results pane 420 include cybersecurity event detection statistics for a modified cybersecurity event detector.

The displayed cybersecurity event detections statistics may include a proportion of a true positive subset of system events determined to be indicative of a potential cybersecurity event using the modified cybersecurity event detector. The proportion of the true positive subset of system events may be displayed as a fraction 'A/B' where A is the number of system events in the true positive subset determined to be indicative of a potential cybersecurity event using the modified cybersecurity event detector, and B is the number of system events in the true positive subset. A change indicator for the true positive subset may also be displayed. The change indicator may displayed as '+i', where 'i' is the number of additional system events of the true positive subset detected by the modified cybersecurity event detector in comparison to a previous version of the cybersecurity event detector, e.g. an earlier modified cybersecurity event detector.

The displayed cybersecurity event detections statistics may include a proportion of a false positive subset of system events determined to be indicative of a potential cybersecurity event using the modified cybersecurity event detector. The proportion of the false positive subset of system events may be displayed as a fraction 'C/D' where Cis the number of system events in the false positive subset determined to be indicative of a potential cybersecurity event using the modified cybersecurity event detector, and D is the number of system events in the false positive subset. A change indicator for the false positive subset may also be displayed. The change indicator may displayed as '-j', where 'j' is the decrease in the number of events in the false positive subset (incorrectly) detected in comparison to a previous version of the cybersecurity event detector, e.g. an earlier modified cybersecurity event detector or an unmodified cybersecurity event detector.

The displayed cybersecurity event detections statistics may include a proportion of a false negative subset of system events determined to be indicative of a potential cybersecurity event using the modified cybersecurity event detector. The proportion of the false positive subset of system events may be displayed as a fraction 'E/F' where E is the number of system events in the false negative subset determined to be indicative of a potential cybersecurity event using the modified cybersecurity event detector, and F is the number of system events in the false negative subset. A change indicator for the false negative subset may also be displayed. The change indicator may displayed as '-k', where 'k' is the decrease in the number of events in the false negative subset detected in comparison to a previous version of the cybersecurity event detector version of the cybersecurity event detector, e.g. an earlier modified cybersecurity event detector.

The GUI may also include a true positives pane 430, a false positives pane 440 and/or a false negatives pane 450. Each of these panes may display one or more properties of one or more system events from the respective subset. These one or more properties may include any available property of the system event. In the illustrated example, for each of the system events, the event ID, the name of the process command causing the system event, and the host name of the system on which the system event occurred are shown. In the illustrated example, tick and/or cross symbols are also shown next to each event. A tick symbol indicates that the system event is detected by the modified cybersecurity event detector and was detected by the previous version of the cybersecurity event detector. A cross symbol indicates that the event is not detected by the modified cybersecurity event detector and was not detected by the previous version of the cybersecurity event detector. A tick symbol with an arrow pointing to a cross symbol indicates that the system event was detected by the previous version of the cybersecurity event detector but is not detected by the modified cybersecurity event detector. A cross symbol with an arrow pointing to a tick symbol indicates that the system event was not detected by the previous version of the cybersecurity event detector but is detected by the modified cybersecurity event detector. While cross and tick symbols are used in the illustrated GUI 400, it should be understood that the same or similar information may be presented in a different way. For example, red dots may be used instead of crosses and green dots may be used instead of ticks.

Computing Device

Figure 5:
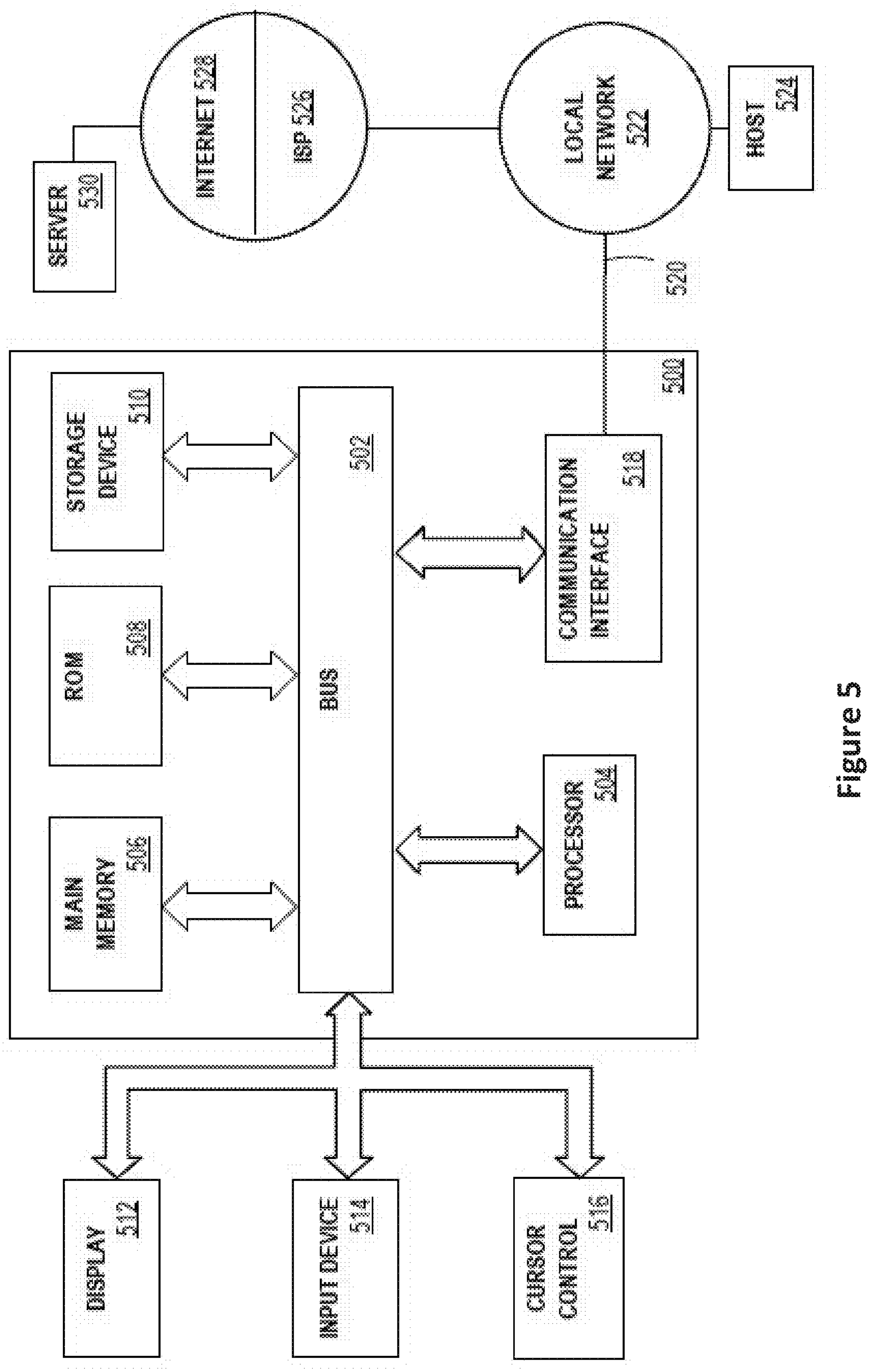
FIG. 5 is a schematic diagram of a computing device in which software-implemented processes of the example embodiments may be embodied.

Referring now to FIG. 5, it is a block diagram that illustrates a computing device 500 in which software-implemented processes of the subject innovations may be embodied. Computing device 500 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor suitable for implementing the subject innovations.

Main memory 506, such as a random access memory (RAM) or other dynamic storage device, also may be coupled to bus 502 for storing information and instructions to be executed by processor(s) 504. Main memory 506 also may be used for storing temporary variables or other intermediate information during execution of software instructions to be executed by processor(s) 504.

Such software instructions, when stored in non-transitory storage media accessible to processor(s) 504, render computing device 500 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and instructions for processor(s) 504.

One or more mass storage devices 510 may be coupled to bus 502 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (e.g., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such instructions may be read into main memory 506 from another storage medium, such as storage device(s) 510. Execution of the software program instructions contained in main memory 506 cause processor(s) 504 to perform the functions of the disclosed systems, methods, and modules.

While in some implementations, functions of the disclosed systems and methods are implemented entirely with software instructions, hard-wired or programmable circuitry of computing device 500 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor(s) 504 for execution. For example, the instructions may initially be carried on a magnetic disk or solid-state drive of a remote computer. The remote computer can load the instructions into its dynamic memory and send the instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the instructions. The instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution The above-described computer hardware is presented for purpose of illustrating the underlying computer components that may be employed for implementing the subject innovations. The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

Extensions and Alternatives

It is understood that any specific order or hierarchy of steps in the methods disclosed are an illustration of example approaches. Based upon design preferences, it is understood that the specific order or hierarchy of steps in the methods may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

The invention claimed is:

1. A method, performed by one or more processors, comprising:

receiving an indication of a first modification to a cybersecurity event detector in a sandbox environment, the cybersecurity event detector being contemporaneously used for detecting one or more potential cybersecurity events in a production environment, the first modification including a first change to one or more rules used by the cybersecurity event detector or a second change to one or more machine learned models used by the cybersecurity event detector;

modifying, in the sandbox environment, the cybersecurity event detector based on the indication of the first modification to the cybersecurity event detector in the sandbox environment;

for each system event in a set of system events associated with a computing system, determining, in the sandbox environment, whether the respective system event is indicative of a potential cybersecurity event using the modified cybersecurity event detector;

determining a first number of system events of a true positive subset of the set of system events, a second number of system events of a false positive subset of the set of system events, and a third number of systems events of a false negative subset of the set of system events;

evaluating one or more cybersecurity event detection statistics including the first number of system events, the second number of system events, and the third number of system events; and in response to the evaluation, generating a second modifications to the cybersecurity event detector in the production environment based on the first modification, the second modification being different from the first modification.

2. The method of claim 1, further comprising:

modifying, in the production environment, the cybersecurity event detector, based on an indication of the second modification to the cybersecurity event detector in the production environment.

3. The method of claim 1, wherein the true positive subset of the set of system events include a system event which was determined, using the cybersecurity event detector prior to modification in the sandbox environment, to be indicative of a potential cybersecurity event and was determined, using the modified cybersecurity event detector, to be indicative of an actual cybersecurity event.

4. The method of claim 1, wherein the false positive subset of the set of system events include a system event which was determined, using the cybersecurity event detector prior to modification in the sandbox environment, to be indicative of a potential cybersecurity event and was determined, using the modified cybersecurity event detector, to not be indicative of an actual cybersecurity event.

5. The method of claim 1, wherein the false negative subset of the set of system events include a system event which was determined, using the cybersecurity event detector prior to modification in the sandbox environment, not to be indicative of a potential cybersecurity event and was determined, using the modified cybersecurity event detector, to be indicative of an actual cybersecurity event.

6. The method of claim 1, further comprising:

generating a graphical user interface; and causing the one or more cybersecurity event detection statistics to be displayed via the graphical user interface.

7. The method of claim 6, wherein an indication of the second modification to the cybersecurity event detector is received via the graphical user interface.

8. A system comprising:

one or more processors; and one or more memories storing instructions that, when executed by the one or more processors, cause the system to perform a set of operations, the set of operations comprising:

receiving an indication of a first modification to a cybersecurity event detector in a sandbox environment, the cybersecurity event detector being contemporaneously used for detecting one or more potential cybersecurity events in a production environment, the first modification including a first change to one or more rules used by the cybersecurity event detector or a second change to one or more machine learned models used by the cybersecurity event detector;

modifying, in the sandbox environment, the cybersecurity event detector based on the indication of the first modification to the cybersecurity event detector in the sandbox environment;

for each system event in a set of system events associated with a computing system, determining, in the sandbox environment, whether the respective system event is indicative of a potential cybersecurity event using the modified cybersecurity event detector;

determining a first number of system events of a true positive subset of the set of system events, a second number of system events of a false positive subset of the set of system events, and a third number of systems events of a false negative subset of the set of system events;

evaluating one or more cybersecurity event detection statistics including the first number of system events, the second number of system events, and the third number of system events; and in response to the evaluation, generating a second modifications to the cybersecurity event detector in the production environment based on the first modification, the second modification being different from the first modification.

9. The system of claim 8, wherein the set of operations further comprises:

modifying, in the production environment, the cybersecurity event detector, based on an indication of the second modification to the cybersecurity event detector in the production environment.

10. The system of claim 8, wherein the true positive subset of the set of system events include a system event which was determined, using the cybersecurity event detector prior to modification in the sandbox environment, to be indicative of a potential cybersecurity event and was determined, using the modified cybersecurity event detector, to be indicative of an actual cybersecurity event.

11. The system of claim 8, wherein the false positive subset of the set of system events include a system event which was determined, using the cybersecurity event detector prior to modification in the sandbox environment, to be indicative of a potential cybersecurity event and was determined, using the modified cybersecurity event detector, to not be indicative of an actual cybersecurity event.

12. The system of claim 8, wherein the false negative subset of the set of system events include a system event which was determined, using the cybersecurity event detector prior to modification in the sandbox environment, not to be indicative of a potential cybersecurity event and was determined, using the modified cybersecurity event detector, to be indicative of an actual cybersecurity event.

13. The system of claim 8, wherein the set of operations further comprises:

generating a graphical user interface; and causing the one or more cybersecurity event detection statistics to be displayed via the graphical user interface.

14. The system of claim 13, wherein an indication of the second modification to the cybersecurity event detector is received via the graphical user interface.

15. A non-transitory computer-readable storage medium comprising instructions that, when executed by one or more processors, cause the one or more processors to perform a set of operations comprising:

receiving an indication of a first modification to a cybersecurity event detector in a sandbox environment, the cybersecurity event detector being contemporaneously used for detecting one or more potential cybersecurity events in a production environment, the first modification including a first change to one or more rules used by the cybersecurity event detector or a second change to one or more machine learned models used by the cybersecurity event detector;

modifying, in the sandbox environment, the cybersecurity event detector based on the indication of the first modification to the cybersecurity event detector in the sandbox environment;

for each system event in a set of system events associated with a computing system, determining, in the sandbox environment, whether the respective system event is indicative of a potential cybersecurity event using the modified cybersecurity event detector;

determining a first number of system events of a true positive subset of the set of system events, a second number of system events of a false positive subset of the set of system events, and a third number of systems events of a false negative subset of the set of system events;

evaluating one or more cybersecurity event detection statistics including the first number of system events, the second number of system events, and the third number of system events; and in response to the evaluation, generating a second modifications to the cybersecurity event detector in the production environment based on the first modification, the second modification being different from the first modification.

16. The non-transitory computer-readable storage medium of claim 15, wherein the set of operations further comprises:

modifying, in the production environment, the cybersecurity event detector, based on an indication of the second modification to the cybersecurity event detector in the production environment.

17. The non-transitory computer-readable storage medium of claim 15, wherein the true positive subset of the set of system events include a system event which was determined, using the cybersecurity event detector prior to modification in the sandbox environment, to be indicative of a potential cybersecurity event and was determined, using the modified cybersecurity event detector, to be indicative of an actual cybersecurity event.

18. The non-transitory computer-readable storage medium of claim 15, wherein the false positive subset of the set of system events include a system event which was determined, using the cybersecurity event detector prior to modification in the sandbox environment, to be indicative of a potential cybersecurity event and was determined, using the modified cybersecurity event detector, to not be indicative of an actual cybersecurity event.

19. The non-transitory computer-readable storage medium of claim 15, wherein the false negative subset of the set of system events include a system event which was determined, using the cybersecurity event detector prior to modification in the sandbox environment, not to be indicative of a potential cybersecurity event and was determined, using the modified cybersecurity event detector, to be indicative of an actual cybersecurity event.

20. The non-transitory computer-readable storage medium of claim 15, wherein the set of operations further comprises:

generating a graphical user interface; and causing the one or more cybersecurity event detection statistics to be displayed via the graphical user interface, wherein an indication of the second modification to the cybersecurity event detector is received via the graphical user interface.

* * * * *